Aug. 21, 1928.

G. J. BARRETT 1,681,567

ACCUMULATOR CONTROL MEANS OF ADDING MACHINES

Filed May 7, 1923   2 Sheets-Sheet 1

INVENTOR.
Glenn J. Barrett
By
Chappell & Earl

Aug. 21, 1928.

G. J. BARRETT 1,681,567

ACCUMULATOR CONTROL MEANS OF ADDING MACHINES

Filed May 7, 1923
2 Sheets-Sheet 2

INVENTOR.
Glenn J. Barrett
By Chappell Earl

Patented Aug. 21, 1928.

1,681,567

UNITED STATES PATENT OFFICE.

GLENN J. BARRETT, OF EVANSTON, ILLINOIS, ASSIGNOR TO PORTABLE ADDING MACHINE COMPANY, OF CHICAGO, ILLINOIS, A CORPORATION OF ILLINOIS.

ACCUMULATOR-CONTROL MEANS OF ADDING MACHINES.

Application filed May 7, 1923. Serial No. 637,196.

This invention relates to improvements in the accumulator control means of adding machines.

My invention relates particularly to improvements in control mechanism for accumulators in adding machines of the "key set" class and in means for controlling said actuations to perform the various functions necessary in a machine of this class; and its objects are to provide a mechanism which will perform these functions in a manner convenient to the operator, and to do so with the fewest possible parts, and in the most simple manner, as well as such other and further objects as will appear in these specifications.

My invention is more particularly pointed out in the claims hereto, and is clearly shown in the accompanying drawings in which:

My invention is applied to what is known in the adding machine art, as the "key set" type. A machine of this class has a suitable keyboard in which the various digits of the number to be added, are set up. An oscillating handle is provided which furnishes the actuating power in the case of the hand driven machine, and an electric motor with suitable clutch is provided when power driven. I have illustrated my invention in connection with the operating handle.

In a machine of this class the adding mechanism, either racks or sectors, are allowed to take their respective adding positions during the forward movement of the handle, away from normal position. The accumulating section is thrown out of co-operative relation with the adding mechanism, either at the very limit of the handle movement back toward normal position, or as in the case of the illustrations herewith, at the very beginning of the handle stroke away from normal position, and is returned to co-operative relation again at the beginning of the return movement of said operating handle.

In machines of this class it is desirable to print the total which may have been accumulated upon the accumulator section. The type for this purpose is positioned by a reverse movement of the accumulators while in co-operative relation with the adding mechanism, a suitable stop being provided for halting the rotation of each accumulator at the "0" point. The positioning of the type being a movement in synchrony with that of the adding mechanism, it will be understood that whatever numeral be represented in an accumulator, will be represented at the proper point for printing. In order to accomplish this, the accumulator section is allowed to remain in co-operative relation with the adding mechanism while the operating handle is drawn away from normal position. If this position is maintained during the return movement of the handle, the same digit as was theretofore represented upon each accumulator, will again be placed there. This process is called "taking a sub total". In order to clear the machine, some mechanism is necessarily provided for throwing the accumulator element out of co-operative relation with the adding mechanism after the "0" point shall have been reached and before the handle returns any great distance toward normal position.

The movements just described usually call for more or less complicated mechanisms, largely because of the possibility of mal-operation. My invention relates more particularly to mechanism for obtaining each of these three movements, namely those for plain addition, for obtaining a subtotal, and for leaving the machine clear.

The type of machine previously described is exemplified in the Barrett adding machine, the Barrett Patent No. 1,326,564, dated December 30, 1919, being an illustration of the type of machine in which my present improvements may be embodied, or in the Burroughs adding machine, see the Burroughs Patent No. 504,963, dated September 12, 1893 both of which are well known.

Figures 2, 3:
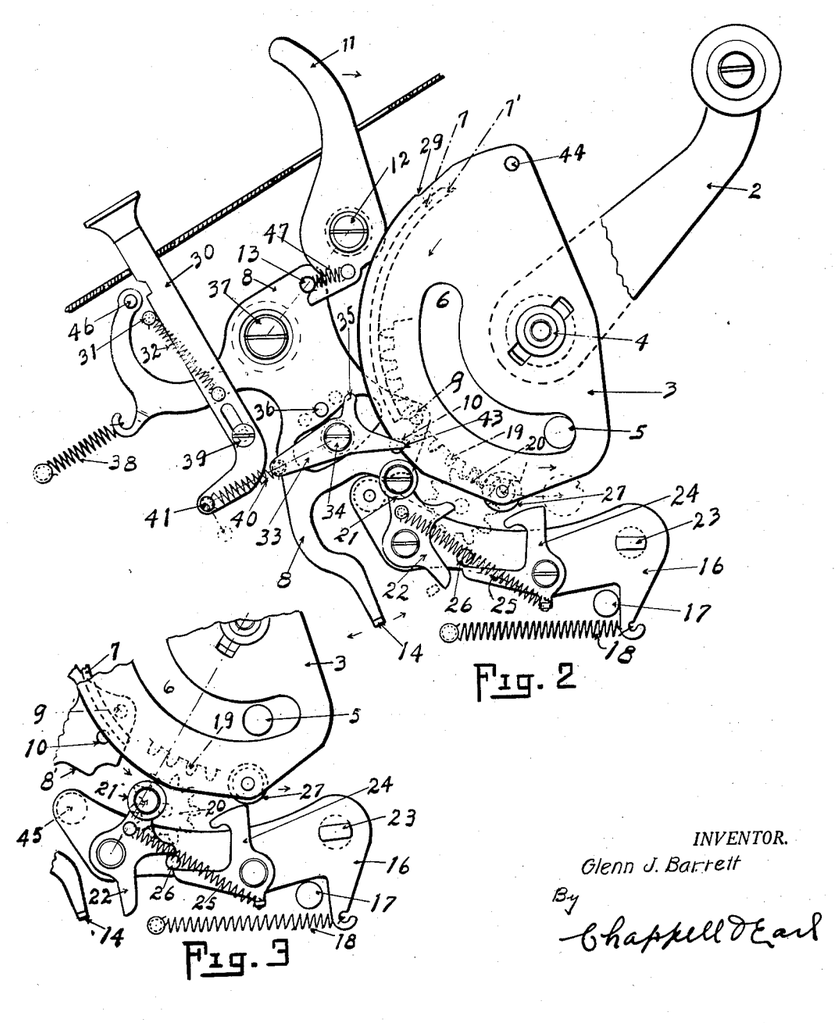
Fig. 2 is a fragmentary right side view of the same.
Fig. 3 is a fragmentary right side view of certain of the parts shown in Fig. 2, showing the main actuating member starting upon its forward stroke or stroke away from normal position in the direction of the arrow, and the accumulator element oscillating means forced downwardly, to position in which the accumulator pinions and co-operating sectors shown in dotted lines, are out of co-operating positions.

As my invention has nothing to do with the details of such features as the accumulator mechanism, adding mechanism, keyboard mechanism, etc., I have not deemed it necessary to show same in this connection. I have, however, in Figs. 2 and 3, shown by dotted lines accumulator pinions, and adding sectors to co-operate therewith, in order to illustrate their relation in general, and also the relation to them of my accumulator element, oscillating means in the embodiment illustrated.

Figure 1:
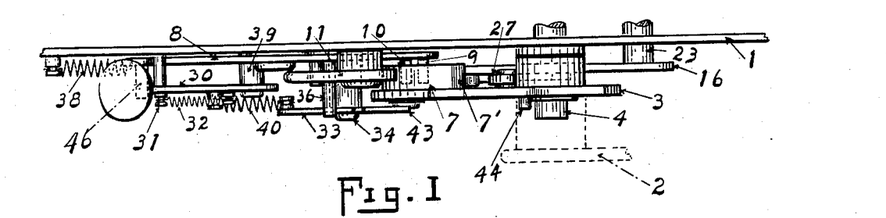
Fig. 1 is a fragmentary plan view showing the lateral relations of some of the parts of an embodiment of my invention.

A more particular description of my invention is as follows:

In a machine of the class described, the adding and accumulator mechanisms operate between suitable side plates, and the control parts for actuating them and controlling their movements, are for the most part usually placed upon the outside of these side plates, or in the space between said side plates and the case or cover for the machine. Fig. 1 is a fragmentary plan view showing the lateral relations of the parts to which this invention particularly relates, 1 being the right side plate referred to. In Fig. 2, 2 is the operating handle. 3 is an oscillating actuating member to which the operating handle 2 is attached. In the embodiment illustrated this actuating member is pivoted and has a cam periphery, 4 being a shaft which acts as the pivotal point therefor. A motor is connected to this shaft in the power driven adding machines. A stud 5 coacting with the slot 6 of the member 3, acts as a stop limiting its stroke. Upon the inside of the actuating member 3 and shown in dotted lines is the locking segment 7 which may also be seen in Fig. 1, the function of said locking segment being to hold the total lever 8 in operative position during the main movement of the actuating member, and to prevent a manipulation of said total lever 8 after the actuating member shall have passed a certain point in its travel away from normal position, in other words, to prevent a mal-operation of the totaling mechanism. This is accomplished by means of two pins or projections, 9 and 10 respectively, projecting from the side of the total lever 8 as shown. Normally, when the handle is operated, 7 passes between these two pins or projections and 8 is thereby securely locked against movement in any direction during the intermediate movement of the actuating member. If the total lever 8 be moved into position for taking a total before the actuating member is actuated, then the pin 10 will take a position at the inside of the locking segment which when moved with the actuating member 3, will securely lock the lever 8 in totaling position until the point 7' of the locking segment 7 shall have passed said pin 10 at which time the lever 8 will drop back to normal position as more particularly described hereinafter.

11 is the total finger piece. I have shown it as a lever pivoted at 12 on the side plate of the machine, and it will be understood as extending up above the keyboard of the machine. A pin 13 projecting from said total lever 8 affords a contact or positive connection between 11 and 8 when 11 is moved in one direction. When the total finger piece 11 is forced into position shown in Fig. 6, the lug 14 on 8 takes the position shown in dotted lines in Fig. 2 and by full lines in Fig. 6. The function of this lug 14 will be more particularly described in connection with the operation of my accumulator oscillating means which I have indicated as a lever-like member 16. 17 is a stop which may be located at any convenient position for limiting the upward movement of 16, when driven by the spring 18. It will be understood that this accumulator oscillating means 16 is in some manner connected to the accumulator of the adding machine, and that said oscillating means moves in synchrony with said accumulator during the process of additions. In Figs. 2 and 3, I have illustrated by dotted lines one of the adding sectors as 19, and a co-acting accumulator pinion as 20, the same being shown in operative relation in Fig. 2 and in inoperative relation in Fig. 3. In this case the pivotal point of both the oscillating means and the accumulator element is at 23; but this is not necessary.

The accumulator oscillating means 16 is capable of a movement from the position as shown in Fig. 2, to that shown in Fig. 3, and back again. I accomplish this movement with a very few parts and in a manner which I will now describe.

Fig. 2 shows the parts in normal position with the operating handle at rest. A roller 21 is mounted on a swinging locking arm or dog 22 which is pivotally mounted on the accumulator oscillating means 16, pivoted at 23. A cam pawl 24 is also pivotally mounted on said oscillating means 16. The spring 25 is common to both the cam pawl 24 and the locking dog 22, and 26 is a stop pin carried by the oscillating means 16, and common to both members 22 and 24. A tappet roller 27 is carried by the actuating member 3, it being mounted upon the side thereof toward the side plate 1, and being adapted to contact with the cam face of the pawl 24 as the actuating member starts on its forward stroke. Fig. 3 shows this tappet roller 27 in position where it has forced the accumulator oscillating means 16 down and thereby moved the accumulator to inoperative position. When the parts are in this position, the locking dog 22 by virtue of the spring 25 snaps into locking position shown in Fig. 3 against the stop pin 26, which very effectually supports and locks the oscillating means 16 in the inoperative position shown in Fig. 3. The locking dog 22 is securely held in this position during the movement of the actuating member on its forward stroke or in the direction of the arrow in Fig. 3, the spring 18 causing the roller 21 to engage the periphery of the actuating member 3, the direction of movement of 3 tending to hold 22 firmly against the stop 26. When however, the actuating member 3 reaches the limit of its forward stroke or the position shown in Fig. 4, and starts upon its return stroke, or in the direction of the arrow in Fig. 4, the notch 29 in 3 which provides a releasing tappet swings the locking dog 22 to position shown in Fig. 2, releasing the oscillating means 16 and allowing it to again take the position shown in Fig. 2. This places the accumulators of the adding machine again in co-operative relation with the adding sector, before the operation of the actuating member 3 has begun to act upon the adding mechanism of the machine. As the actuating member 3 carrying the tappet roller 27 swings back to a position near normal, the roller 27 engages with the right side of the cam pawl 24 and forces the same out of its path of travel, the spring 25 permitting this. In Fig. 2, the tappet roller is shown in dotted lines as it is about to contact with 24 as just described. Thus it will be clearly seen that the pawl 24 is only active in forcing a movement of 16, when the actuating member is on its forward stroke.

Figures 4, 5, 6, 7, 8:
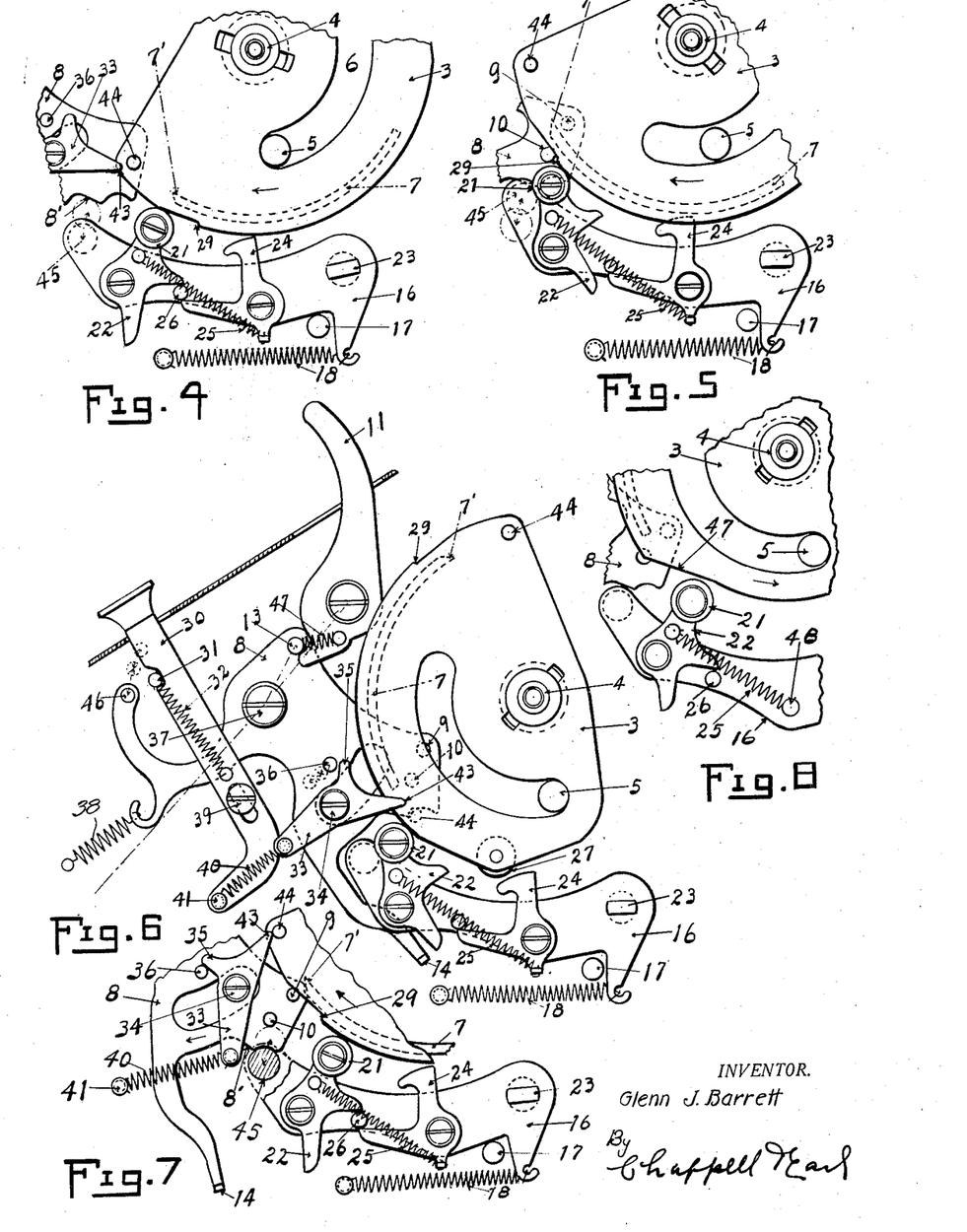
Fig. 4 is a fragmentary view of parts shown in Fig. 2, the actuating member being moved to its limit of its forward stroke and ready to start back in the direction of the arrow.
Fig. 5 is a fragmentary view of the same parts as illustrated in Fig. 4 in their respective relative positions as the actuating member starts on its return stroke, the tappet formed by the notch or indentation in the periphery of the actuating member having just forced the locking dog backwardly toward the left allowing the accumulator oscillating means to take the position shown in Fig. 2.
Fig. 6 is a fragmentary view of the same parts as are illustrated in Fig. 2 with the total lever moved into operative position and the "Clear" button depressed, in which condition, when the operating handle is drawn forwardly, the machine will be made to print whatever total the accumulators recorded, and the latter left at the "0" point,—in other words,—clear.
Fig. 7 is a fragmentary view showing some of the parts illustrated in Fig. 6, during the early return of the actuating member, more particularly showing the means for forcing the accumulators out of co-operative relation with the adding mechanism during the operation of "clearing" the machine.
Fig. 8 is a fragmentary view of a modified structure for forcing the accumulators out of co-operative relation with the adding sectors, during the early part of the forward actuating member stroke.

Other mechanisms shown in the several figures have more to do with the controlling of the relative movements of the oscillating means 16 to obtain a total, clear, or a non-add operation which are well known functions in machines of this class. It will be clearly seen that when the total lever 8 is actuated by the finger lever 11 and the co-operating parts take the positions as shown in Fig. 6, and when the oscillating means 16 is forced downwardly by reason of the action of the roller 27 upon the cam pawl 24, the oscillating means 16 will not remain in the position shown in Fig. 3 but will go back to the position shown in Fig. 2 for the reason that the lug 14, when in position shown in Fig. 6 will not allow the locking dog 22 to swing into locking position. This permits the accumulator element to maintain its co-operative relation with the adding mechanism during the forward movement of the operating handle and the respective accumulators will be rotated backwardly to the " 0 " point in a manner well understood, which process in conjunction with a suitable printing mechanism not shown, causes a total to be printed. If the operation just described takes place with the clear member 30 in position shown in Fig. 2, when the actuating member 3 reaches the limit of its forward stroke, the pin 10 will move past the locking segment 7 at 7', and the total lever 8 will then take the normal position shown in Fig. 2. In this case, there being no mechanism to separate the accumulating pinions from the adding sectors 19, the accumulator pinions will be returned to the same position as before taking the totaling operation. In other words, a sub totaling operation is accomplished. If however, the clear member 30 be placed as shown in Fig. 6 before positioning 8 as shown in Fig. 6, or after performing a sub totaling operation as just described, but before a return of the actuating member, then the accumulating element is thrown out of co-operative relation with the adding mechanism before any actuation of the latter, by means of the operation of the intermediate bell crank lever 33. This movement is accomplished in the following manner:

The clear member 30 is, in the embodiment illustrated, a depressible bar carrying a finger button located in the keyboard of the machine. 31 is a locking pin and 32 is a spring tending to hold said clear member 30 in normal position. 33 is a lever pivoted upon the side plate of the machine at 34. 35 is an upwardly extending ear from said lever 33 adapted to contact against a pin 36 on the total lever 8, which is pivoted upon the side plate of the machine at 37. This total lever 8 is yieldingly supported to swing in either direction by the spring 38 which normally holds the total lever 8 in the position shown in Fig. 2. 39 is a stud also extending from the side plate 1 and acts as the lower guide for the clear member 30 co-operating with a slot in said clear member 30. The upper end of the clear member 30 passes through a slot in the top plate of the machine in which it is free to move into locking position shown in Fig. 6. 40 is a spring extending from the arm 41 on 30 to said lever 33. This spring holds the lever 33 in normal position shown in Fig. 2. The lower position of the arm 41 is shown by dotted line in Fig. 2 when the parts are placed as shown in Fig. 6, causing the lever 33 to turn, slightly positioning the end 43 thereof in the path of travel of the tappet pin 44 on the actuating member 3. When the parts are in position as shown in Fig. 6 and the handle is drawn forwardly to actuate the actuating member, the tappet pin 44 engages the upper side of the lever 33 at 43 and merely swings the lever 33 around out of the way. However, upon the beginning of the return travel of the actuating member the tappet pin 44 engages with the under side of 43 and the lever 33 is actuated, its ear 35 engaging with the pin 36 causing the total lever 8 to swing toward the left. 45 is a stud or projection from the oscillating means 16, and 8' is a cam face upon the total lever 8 adapted to coact with the same. As the lever 8 is moved as just described, this cam pushes the oscillating means 16 down into position shown in Fig. 7 in which position the accumulator pinion is forced out of co-operative relation with the adding sector, and the accumulators if positioned by the totalizing operation previously described, at the "0" point, will be left there during the return of the handle and the machine will be left clear. In connection with this operation it will be noted that the lever 33 swings the lever 8 upon its pivot 37 and the pin 9 is made to pass upon the outside of the locking segment 7 at the beveled end 7' thereof, thus holding the lever 8 in this position during a return of the adding mechanism to normal position and while the accumulating element is out of co-operative relation with the same.

It is obvious that a separate lever may be used for this clearing operation, but I have preferred to give the lever 8 a double function allowing it to swing in both directions for this purpose. It will be noted that the stud 34 extends through an opening or slot in 8, it being secured to the side plate of the machine. Figs. 2 and 6 show by full and dotted lines the various positions of the pin 36, during these two movements of 8.

Owing to the construction I have just described this clearing feature becomes a simple non-add feature if operated while the total lever 8 is in normal position as shown in Fig. 2. This can be done at any time before starting the return stroke of the actuating member. In this case the lever 8 prevents the accumulator oscillating means 16 from taking its normal position as shown in Fig. 2, during the return stroke of the actuating member, and the accumulating element is therefore held out of co-operative relation with the adding mechanism. In this connection it will be noted that I have provided an extension 46 from the lever 8, the function of which is to automatically unlock the depressed clear member 30 when the lever 8 is swung into position shown in Fig. 7, in which case the clear member 30 moves back to normal position by virtue of the spring 32. When the clear member 30 is depressed, the notch shown in the upper portion thereof is adapted to engage the pin 31. The projection 46 forces the clear member 30 off the pin 31 when the lever 8 is actuated by the contact of the ear 35 against the pin 36.

Fig. 8 illustrates a modified structure for forcing the accumulator element out of cooperative relation with the adding mechanism, eliminating the use of the pawl 24. The parts shown are in position illustrated in Fig. 2, or normal position. However, instead of the tappet roller 27 shown in Fig. 2, the member 3 is provided with a cam surface 47. As the actuating member approaches normal position going in a direction opposite to that indicated by the arrow, the locking arm 22 swings into operative position shown in Fig. 8. When the handle is drawn forward, the cam surface 47 contacts with the roller 21 and the accumulator actuator 16 is forced downwardly to position shown in Fig. 3. The spring 25 is shown attached to a pin 48.

I have illustrated and described my improvements in embodiments which I have found very practical. I have not attempted to illustrate and describe other embodiments and adaptations as I believe the disclosure made will enable those skilled in the art to which my invention relates to embody or adapt the same as may be desired.

I have only shown such parts of an adding machine as seem necessary or desirable for an understanding of my improvements.

The features of invention shown in the drawings and described herein, but not claimed are claimed in my co-pending application, Serial No. 50,219, filed August 14, 1925. These features are shown in part in Fig. 8 of the drawings.

Having thus described my invention, what I claim as new and desire to secure by Letters Patent is:

1. The combination in an adding machine having an adding element and an accumulator element movable into and out of cooperating relation with said adding element, of a control means for said accumulator element comprising a lever operatively connected to said accumulator element, an oscillating actuating member having a cam periphery, a tappet roller carried by said actuating member, a pawl pivotally mounted on said lever to be engaged by said tappet roller during the early part of the forward stroke of said actuating member, to move the accumulator element out of cooperative relation with the adding element, a locking dog pivotally mounted on said lever and provided with a roller adapted to coact with the periphery of said actuating member, to hold the accumulator element out of cooperative relation with the adding element during the forward stroke of the actuating member, the periphery of said actuating member being notched to engage said roller on said locking dog during the early part of the return stroke of said actuating member to release the locking dog, and a spring acting to return said lever when said locking dog is released to return the accumulator element to cooperative relation with the adding element to effect adding on the return stroke of the actuating member.

2. The combination in an adding machine having an adding element and an accumulator element movable into and out of cooperating relation with said adding element, an actuated member connected to said accumulator element, an actuating member, a tappet carried by said actuating member, a pawl pivotally mounted on said actuated member to be engaged by said tappet during the early part of the forward stroke of said actuating member to move the accumulator element out of cooperative relation with the adding element, and a locking dog pivotally mounted on said actuated member to hold the accumulator element out of cooperative relation with the adding element during the forward stroke of the actuating member, said actuating member being adapted to release said locking dog during the early part of the return stroke of said actuating member and permit the accumulator element to move into cooperative relation with the adding element to effect adding on the return stroke of the actuating member.

3. The combination in an adding machine of the class described having an adding element and an accumulator element movable into and out of cooperating relation with said adding element, of an oscillating actuating member having a cam periphery, a lever operatively connected to said accumulator element, a contact means between said actuating member and said lever during the early part of the forward stroke of the actuating member to move the accumulator element out of cooperative relation with the adding element, means for rendering said contact means inoperative during the return stroke of said actuating member, a locking dog pivotally mounted on said lever and provided with a roller adapted to contact with the periphery of said actuating member to hold the accumulator element out of cooperative relation with the adding element during the forward stroke of the actuating member, a stop for supporting said dog in locking position, a spring urging said dog to locking position, said actuating member having a notch in its periphery engaging said roller on said locking dog during the early part of the return stroke of said actuating member whereby said locking dog is released to permit the accumulator element to move back into cooperative relation with the adding element, and a spring acting to return said lever when said locking dog is released to effect adding upon the return stroke of the actuating member.

4. The combination in an adding machine having an adding element and an accumulator element movable into and out of cooperating relation with said adding element, of an actuating member, an actuator for said accumulator element, a contact means between said actuating member and said actuator during the early part of the forward stroke of the actuating member to move the accumulator element out of cooperative relation with the adding element, means for rendering said contact means inoperative during the return stroke of said actuating member, a locking dog pivotally mounted on said actuator to contact with said actuating member to lock the accumulator element out of cooperative relation with the adding element during the forward stroke of the actuating member, and yielding means for moving said dog to and supporting it in locking position, said actuating member being adapted to release said locking dog during the early part of the return stroke of said actuating member to permit the accumulator element to move into cooperative relation with the adding element to effect adding on the return stroke of the actuating member.

5. The combination in an adding machine of the class described comprising an accumulator element movable into and out of operative position, of means for controlling said accumulator element comprising a lever, an actuating member, a contact means between said actuating member and said lever during the early part of the forward stroke of said actuating member whereby said accumulator element is shifted to inoperative position, means for rendering said contact means inoperative during the return stroke of said actuating member, means for locking said lever in actuated position comprising a locking dog coacting with said actuating member, means carried by said actuating member for releasing said dog during the early part of the return stroke of said actuating member, and a spring acting to return said lever when said locking dog is released.

6. The combination in an adding machine of the class described having an adding element and an accumulator element operatively associated therewith and movable to and from operative position, an actuating member having reciprocating movement, an actuated member operatively associated with said accumulator element, coacting members on said actuating and actuated members adapted to engage during the early part of the forward stroke of the actuating member whereby the accumulator element is moved to inoperative position, a locking dog for holding said actuated member in such position, a spring for actuating said locking dog, means for releasing said locking dog during the early part of the return stroke of said actuating member, and a spring for returning said accumulator element to operative position upon the releasing of said locking dog.

7. The combination in an adding machine having an adding element and an accumulator element operatively associated therewith and movable to and from operative position, of a reciprocating actuating member, a lever operatively associated with said accumulator element, means carried by said actuating member for moving said lever in one direction during the early part of the stroke of said actuating member, means for locking said lever in actuated position comprising a dog, means for swinging said dog into locking position during the early part of the forward stroke of said actuating member, means for releasing said locking dog during the early part of the return stroke of said actuating member, and a spring for movably supporting said accumulator element in operative relation to said adding element.

8. The combination in an adding machine having an adding element and an accumulator element associated therewith and movable to and from operative position, of an actuating member, an actuated member operatively associated with said accumulator element, a contact means between said actuating member and said actuated member during the early part of the forward stroke of the actuating member, a locking dog for said actuated member, means for placing said locking dog in locking position during the contact engagement between said actuating and actuated members, means for yieldingly holding said locking dog in locking position, means for releasing said locking dog during the early part of the return movement of said actuating member, and means for returning said accumulator element to operative position when said locking dog is released.

9. The combination in an adding machine having an adding element and an accumulator element operatively associated therewith and movable to and from operative position, of means for moving said accumulator element to inoperative position comprising an actuated member operatively connected thereto, a reciprocating actuating member, means carried by the latter for moving said actuated member in one direction during the early movement of said actuating member from its normal position, a locking dog carried by said actuated member, means for erecting said locking dog during the forward stroke of said actuating member and after it has acted upon said actuated member, means governed by said actuating member for releasing said locking dog during the return stroke of said actuating member, and means for returning said actuated member to its normal position after said locking dog has been released.

10. The combination in an adding machine having an adding element and an accumulator element operatively associated therewith and movable to and from operative position, of means for moving said accumulator element to inoperative position comprising an actuated member operatively connected thereto, a reciprocating actuating member, means carried by the latter for moving said actuated member in one direction during the early movement of said actuating member from its normal position, a locking dog carried by said actuated member, means for erecting said locking dog during the forward stroke of said actuating member and after it has acted upon said actuated member, means governed by said actuating member for releasing said locking dog during the return stroke of said actuating member, and means for returning said actuated member to its normal position after said locking dog has been released.

11. The combination in an adding machine of the class described of an accumulator element movable to and from operative position, an actuating member, a contact means between said actuating member and said accumulator element during the early part of the forward stroke of the actuating member, a locking dog for holding said accumulator element in inoperative position, means for placing said locking dog in locking position during the contact engagement between said actuating member and said accumulator element, means for releasing said locking dog during the early part of the return movement of said actuating member, and means for returning said accumulator element to operative position when said locking dog is released.

12. The combination in an adding machine of the class described having an accumulator element movable to and from operative position, of an actuating member, coacting members on said actuating member and accumulator element adapted to engage during the early part of the forward stroke of the actuating member whereby the accumulator element is moved to inoperative position, a locking means for holding said accumulator element in inoperative position, means for releasing said locking means during the early part of the return stroke of said actuating member, and a spring for returning said accumulator element to operative position upon the releasing of said locking means.

13. The combination in an adding machine of the class described comprising an accumulator element movable into and out of operative position, of an oscillating actuating member, operating connections for said actuating member and accumulator element whereby said accumulator element is moved to inoperative position during the early part of the forward stroke of said actuating member, a locking dog for holding said accumulator element in inoperative position, manually operated total lever means for rendering said locking dog inoperative, a locking segment on said actuating member, pins on said total lever to cooperate with said locking segment, said locking segment being normally out of engagement with said pins when said actuating member is at the limits of its stroke and being adapted to move into locking engagement therewith as said actuating member moves from such limits, and means for returning said accumulator element to normal position when not restrained by said locking dog.

14. The combination in an adding machine of the class described, of an accumulator element movable into and out of operative position, an oscillating actuating member, means carried thereby for moving said accumulator element to inoperative position, automatically acting means for retaining said accumulator element in inoperative position, a total means for rendering said retaining means inoperative, a total finger-piece operatively associated with said total means, means for returning said accumulator element when said retaining means is released, means for locking said total means in operative position and against improper manipulation comprising a locking member carried by said actuating member, and projections on said total means coacting therewith during the stroke of said actuating member but disengageable therefrom at both limits of its stroke.

15. The combination in an adding machine of the class described comprising an accumulator element movable into and out of operative position, of an oscillating actuating member, operating connections therefor to said accumulator element whereby said accumulator element is moved to inoperative position, a locking dog for holding said accumulator element in inoperative position, a totaling lever adapted when actuated to render said locking dog inoperative, a locking segment on said actuating member, and coacting parts on said total lever adapted to prevent the manipulation of said totaling lever during the movement of said actuating member, said parts being disengaged at the ends of the stroke of said actuating lever.

16. The combination in an adding machine of the class described comprising an accumulator element movable into and out of operative position, of an actuating member operatively associated with said accumulator element whereby said accumulator element is moved from operative position during the early movement of the work stroke of said actuating member, means for locking said accumulator element in inoperative position, manually controlled means for rendering said locking means inoperative, means for returning said accumulator element to normal position when said locking means has been rendered inoperative, and means for locking said manually controlled means against movement during the intermediate movement of said actuating member.

17. The combination in an adding machine of the class described, of an accumulator element movable to and from operative position, a reciprocating actuating member operatively associated with said accumulator element whereby it is moved to inoperative position by the initial movement of said actuating member on its forward stroke, means for locking said accumulator element in inoperative position during the remainder of the movement of the said actuating member, manually controlled means for preventing the operation of said locking means, and means carried by said reciprocating actuating member for locking said manually controlled means against manipulation during the intermediate movement of the said actuating member.

18. The combination in an adding machine of the class described having an accumulator element movable into and out of operative position with an adding element, of an actuated member operatively connected to said accumulator element, an oscillating actuating member operatively associated with said actuated member whereby said accumulator element is moved to inoperative position on the forward stroke of said actuating member, means controlled from the keyboard of the adding machine for maintaining the cooperative relation of said accumulator element with said adding element, means independent of said means controlled from said keyboard for moving said accumulator element out of cooperative relation with said adding element during the return stroke of said actuating member comprising a manually operated push bar, a pin on said actuating member, a pivotally mounted bell crank lever having a part normally out of the path of travel of said pin, a spring connecting said bell crank lever with said push bar whereby the lever is moved to and yieldingly held in two positions, it being adapted to coact with said pin on said actuating member when in one position, and a pivotally mounted control lever for holding said accumulator element in inoperative position, said control lever having a projection positioned to be engaged by said bell crank lever.

19. The combination in an adding machine of the class described, of an accumulator element movable into and out of operative position, an actuating member, means for forcing said accumulator element to inoperative position during the early part of the forward stroke of said actuating member, a locking means for maintaining said accumulator element in inoperative position during the remainder of the forward stroke of said actuating member, manually controlled means for preventing the operation of said locking means, and means for returning said accumulator element to operative position when the operation of said locking means is prevented.

20. The combination in an adding machine of the class described having an operating handle, a reciprocating adding mechanism and a vibrating accumulator element cooperating therewith, of means for actuating said accumulator element to and from operative relation with said adding mechanism, means controlled from the keyboard for maintaining said accumulator element in operative relation to said adding element during the forward stroke of said handle, means independent of such maintaining means for moving said accumulator element to inoperative position during the return stroke of said handle comprising an oscillating actuating member connected to said handle and having a projection thereon, a pivotally mounted bell crank lever, one arm of which while normally out of the path of travel of said projection may be moved into the path thereof, key-board means for shifting said bell crank lever to bring its said projection into the path of travel of said projection on said actuating member comprising a push bar means for locking the same in actuated position, a yielding connection between said push bar and said bell crank lever, a control lever pivotally mounted in operative relation to said actuating member, and a cam connection between said control lever and said actuating means for said accumulator element, said control lever and bell crank lever having coacting parts whereby said control lever is actuated in one direction through said bell crank lever, said bell crank lever being also adapted when moved to one position to unlock said push bar.

21. The combination in an adding machine of the class described having an operating handle, a reciprocating adding mechanism and a vibrating accumulator element cooperating therewith, of means for actuating said accumulator element to and from operative relation with said adding mechanism, means controlled from the key-board for maintaining said accumulator element in operative relation to said adding element during the forward stroke of said handle, means independent of such maintaining means for moving said accumulator element to inoperative position during the return stroke of said handle comprising an oscillating actuating member connected to said handle and having a projection thereon, a pivotally mounted bell crank lever, one arm of which while normally out of the path of travel of said projection may be moved into the path thereof, key-board means for shifting said bell crank lever to bring its said projection into the path of travel of said projection on said actuating member and operatively associated with said actuating means for said accumulator element, said control lever and bell crank lever having coacting parts whereby said control lever is actuated in one direction through said bell crank lever.

22. The combination in an adding machine of the class described comprising a reciprocating adding element and an accumulator element operatively associated therewith and movable to and from operative position, of an oscillating actuating member, means comprising said actuating member for moving said accumulator element to and from operative position relative to said adding element, manually controlled means for maintaining said accumulator element in cooperative relation with said adding element during the forward stroke of said actuating member, manually controlled means independent of said means for maintaining the operative relation for moving said accumulator element out of operative relation with said adding element during the early part of the return stroke of said actuating member comprising a lever, an operating connection therefor to said means for moving said accumulator element, a key, means for locking said key in depressed position, an intermediate lever adapted to have contacting engagement with said lever connected to said accumulator actuating means, said actuating member having a part adapted to contact with said intermediate lever when the latter is moved to one position, said key being operatively connected to said intermediate lever, and means for automatically releasing said key actuated during the return movement of said actuating member.

23. The combination in an adding machine of the class described comprising a reciprocating adding element and an accumulator element operatively associated therewith and movable to and from operative position, of an oscillating actuating member, means comprising said actuating member for moving said accumulator element to and from operative position relative to said adding element, manually controlled means for maintaining said accumulator element in cooperative relation with said adding element during the forward stroke of said actuating member, manually controlled means independent of said means for maintaining the operative relation for moving said accumulator element out of operative relation with said adding element during the early part of the return stroke of said actuating member comprising a lever, an operating connection therefor to said means for moving said accumulator element, and an intermediate lever adapted to have contacting engagement with said lever connected to said accumulator actuating means, said actuating member having a part adapted to contact with said intermediate lever when the latter is moved to one position.

24. The combination in an adding machine of the class described comprising an adding element and an accumulator element operatively associated therewith and movable to and from operative position relative to said adding element, of an actuating member, means for actuating said accumulator element to and from operative relation with said adding element, an independent manually controlled means actuated by said actuating member for maintaining said accumulator element out of cooperative relation with said adding element during the return movement of said actuating member, means for locking said independent means in operative position, and means actuated by said actuating member for unlocking said means during the return movement of said actuating member.

25. The combination in an adding machine of the class described, of an accumulator element movable into and out of operative position, an oscillating actuating member therefor, means operatively associated with said actuating member for moving said accumulator element out of operative position during the early movement of said oscillating actuating member, means for retaining said accumulator element in said inoperative position during the balance of the movement of said oscillating member from normal position, means operatively associated with said actuating member for moving said accumulator element into operative position during the early return movement of said actuating member, and manually controlled means actuated by the movement of said actuating member for moving said accumulator element out of operative position prior to any operative accumulating therein.

26. The combination in an adding machine of the class described, of an accumulator element movable into and out of operative position, an oscillating actuating member therefor, a contact means carried by said oscillating actuating member for moving said accumulator element into inoperative position during the early movement of said oscillating actuating member, a swinging locking means carried by said accumulator element adapted to swing into locking position against said oscillating actuating member when said accumulator element is moved into inoperative position, means carried by said oscillating actuating member for moving said swinging locking means out of locking position during the early return movement of said oscillating actuating member, and means for returning said accumulator member to normal position when said locking means is moved out of locking position.

27. The combination in an adding machine of the class described, of an accumulator element movable into and out of operative position, an oscillating actuating member therefor, contact connections between said oscillating actuating member and said movable accumulator element whereby said accumulator element is moved into inoperative position during the early forward movement of said oscillating actuating member, means for holding said accumulator element in inoperative position comprising a swinging locking arm carried by said movable accumulator element, means for swinging said locking arm into locking position against said oscillating actuating member when said accumulator element is moved into inoperative position, means for preventing the swinging of said locking arm into locking position consisting of a totaling lever having a projection adapted to move into the path of travel of said locking arm, a totaling finger piece having a positive connection with said totaling lever when moved in one direction and a yielding connection when moved in the opposite direction, a locking segment on said actuating member, locking pins on said totaling lever adapted to cooperate with said locking segment, being normally out of locking engagement with said segment when said actuating member is near either limit of its oscillating stroke, and in locking engagement with said segment during the intermediate movement of said oscillating actuating member, and a spring for returning said accumulator element to normal position when not restrained by said swinging locking arm.

28. The combination in an adding machine of the class described, of an accumulator element movable into and out of operative position, an oscillating actuating member therefor, means for moving said accumulator element out of operative position during the early forward movement of said oscillating actuating member, means for restraining said accumulator element in said inoperative position consisting of a swinging arm carried by said accumulator element, means for swinging said arm into locking position against said oscillating actuating member when said accumulator element is moved into inoperative position, means for preventing said swinging arm from moving into locking position consisting of a totaling lever, a finger lever, contact connections between said totaling lever and said finger lever, and a projection from said totaling lever adapted to be moved into the path of travel of said swinging arm.

29. In a key-set adding machine having accumulator and accumulator-driving elements and an oscillating general operator, the combination of an actuating element shiftable back and forth by said operator, means normally automatically operated by said actuating element for rendering the accumulator-driving elements ineffective on the accumulator elements during one stroke of said actuating element and effective during the opposite stroke thereof to effect an adding operation, an oppositely shiftable member stationary during adding operations, a finger piece shiftable to move said member in one direction into a position in which it coacts with said automatically operated means to render the driving elements effective on both strokes of the actuating element, and independent normally ineffective key-set means movable into a position for operation by the actuating element on that stroke only thereof during which the driving elements are normally effective to thereby cause said key-set means to move said oppositely shiftable member in a direction opposite to that in which the member is moved by the finger piece, said member, when so moved by the actuating element and the key-set means, acting on the automatically operated means to render the accumulator driving elements ineffective.

30. In a machine of the class described having accumulator pinions and actuating racks therefor normally engaged therewith, the combination of a pivoted member movable to shift the pinions out of engagement with the racks, an oscillating general operator, means operated by the general operator for actuating said pivoted member to render the racks ineffective on the pinions during the forward stroke of said operator and effective on the return stroke thereof, a normally ineffective member, a sub-total finger piece operable to set said normally ineffective member in position to cooperate with said general-operator-actuated means to permit driving of the pinions by the racks during the forward stroke of the operator, a second finger piece, and means settable by actuation of said second finger piece for establishing and operating connection between said normally ineffective member and the general operator effective on the return stroke only of said operator, said normally ineffective member being arranged to rock said pivoted member when actuated by the general operator to prevent driving of the pinions by the racks.

31. In a key-set adding machine having accumulator pinions and driving racks therefor, the combination of an oscillating general operator, means controlled by the general operator for shifting the accumulator pinions to prevent driving thereof during the forward stroke of the operator and permit driving thereof during the return stroke of the operator to effect adding, a movably supported member stationary during adding operations, manually manipulative sub-totaling means for shifting said member to a position in which it modifies the action of the general-operator-controlled means to permit driving of the pinions on the forward stroke of the operator, and manually manipulative means whereby a driving connection may be established between said member and operator effective only on the return stroke of the operator, while said member is in either its normal or sub-totaling adjusted position, for effecting a movement of said member by which it operates the accumulator pinion shifting means to prevent driving of the pinions during the return stroke of the operator.

32. In a key-set adding machine having an accumulator and accumulator driving means, the combination of an oscillating general operator, means controlled by said operator for shifting the accumulator during an adding operation to prevent driving of the accumulator on the forward stroke of the operator and permit driving thereof on the return stroke of the operator, an oppositely shiftable member, means holding said member in an intermediate ineffective position during adding operations, a normally ineffective operating connection between said member and operator adapted when rendered effective to shift said member on the return stroke of the operator to one side of its normal intermediate position either from said normal position or its oppositely shifted position, and manually manipulative means whereby said connection may be rendered effective and whereby said member may be shifted to said oppositely shifted position either with or without rendering said operating connection effective, said member, when moved by the general operator, acting on the accumulator shifting means to move and hold the accumulator out of engagement with its driving means, and acting on the accumulator shifting means when in its oppositely shifted position to permit driving of the accumulator on the forward stroke of the operator.

33. In a key-set adding machine having an oscillating general operator and an accumulator shifter movable to normally prevent driving of the accumulator on the forward stroke of the general operator and permit driving thereof on the reverse stroke of said operator to effect adding, the combination of main accumulator shifter actuating means, independent key-set accumulator shifter actuating means normally stationary during adding operations and operable by the general operator only on the reverse stroke thereof when set in active position to prevent driving of the accumulator, and independent manually operable means for adjusting said independent accumulator shifter actuating means to cause the same to modify the action of the main shifter actuating means to permit driving of the accumulator on the forward stroke of the operator.

34. In a key-set adding machine having an accumulator, accumulator driving means, and an oscillating general operator, the combination of a swinging accumulator shifting member, general-operator-actuated means for swinging said member to positions preventing driving of the accumulator on the forward stroke and permitting driving of the accumulator on the return stroke of the operator, an oscillatable auxiliary control member for said swinging member normally yieldably held in a central ineffective position and adapted when shifted to one side of its central position to adjust said general-operator-actuated means to permit driving of the accumulator on the forward stroke of the operator and adapted when shifted to the opposite side of its central position to swing said swinging member into position to prevent driving of the accumulator on the return stroke of the operator, and manually controlled means whereby said member may be moved to either of said oppositely shifted positions or first moved to its first mentioned shifted position and then moved to its other shifted position when the general operator starts its return stroke.

35. In a key-set adding machine, the combination of main accumulator control means for effecting adding operations, an auxiliary key-set accumulator control device for eliminating the adding function of the machine, and manually operable means for adjusting said device independently of its key to cause the device to effect a sub-totaling operation of the accumulator or for adjusting said device in conjunction with setting of its key to cause said device to act on the main control means to effect a totaling and clearing operation of the accumulator.

36. In a key-set adding machine having reciprocating accumulator driving means and a general-operator-actuated means for shifting an accumulator into and out of engagement with said driving means during adding operations, the combination of a single movable element stationary during adding operations and adapted to act directly on said accumulator shifting means to modify the action of said means to effect non-adding, totaling and clearing, or sub-totaling, at will, and manually settable means for controlling movements of said element to effect the desired one of said operations upon actuation of the general-operator-actuated accumulator shifting means.

37. In a key-set adding machine, a cam oscillatable by the general operator of said machine, a swinging arm for carrying the accumulator of the machine out of active position, a pivoted device on said arm cooperating with said cam during movement of the cam in one direction only to hold the accumulator in inactive position, a hand-controlled member pivoted to swing on an axis parallel with the axes of the cam and arm, means for yieldably holding said member normally in an ineffective central position, hand-operated means for swinging said member to a position at one side of its normal position to cause said member to engage and disable the pivoted device, hand-operated means settable for cooperation with said member and cam on that stroke only of the cam during which the accumulator is normally in active position to cause said cam to swing said member to the opposite side of its normal position, whether said member be in its position for disabling the pivoted device or in its normal position, to cause said member to engage and swing said arm to carry the accumulator to inactive position.

38. In a key-set adding machine having an accumulator, accumulator driving means, an oscillating general operator, means controlling shifting of the accumulator in timed relation with the general operator to effect adding, the combination of an auxiliary and normally inactive accumulator control means, a finger piece for setting said auxiliary means to cooperate with the main controlling means to prevent driving of the accumulator during a complete cycle of operation of the general operator, and a finger piece for setting said auxiliary means to cooperate with said main controlling means to permit driving of the accumulator during movement of the operator on both strokes of a cycle of operation thereof, and connections between said auxiliary control means and said finger pieces whereby both the finger pieces may be set to cause said auxiliary means to cooperate with the main controlling means to effect clearing of the accumulator.

39. The combination in an adding machine of the class described comprising an accumulator element movable into and out of operative position, of an oscillating actuating member, operating connections for said actuating member and accumulator element whereby said accumulator element is moved to inoperative position during the early part of the forward stroke of said actuating member, a locking dog for holding said accumulator element in inoperative position, manually operated total lever means for rendering said locking dog inoperative, a locking segment on said actuating member; two laterally projecting pins on said total lever to cooperate with said locking segment; said total lever being adapted for movement in either direction from normal position and said pins being so spaced that said locking segment will normally pass between the pins but the pins are adapted to cooperate with said locking segment to hold said total lever against return movement after it has been displaced in either direction from normal; and means for returning said accumulator element to normal position when not restrained by the locking dog.

40. In a key-set adding machine the combination of a shaft; adding sectors mounted thereon; a handle secured to said shaft for rotating the same; a register wheel unit pivotally mounted below said adding sectors, the register wheels of which are adapted for movement into and out of engagement with said adding sectors; a rock arm connected with said register wheel unit for moving the latter; a spring for normally holding the register wheel unit with the register wheels in engagement with the adding sectors; an actuating member in the form of a cam disk secured to and rotatable with said shaft; means carried by the said rock arm to be engaged by the cam disk to move the register wheels out of engagement with the adding sectors; a total clearing lever pivotally mounted adjacent said cam disk and provided with means for moving the register wheel unit to disengage the register wheels from the adding sectors on the return stroke of the handle; a trip lever pivotally mounted adjacent the cam disk; a pin on the cam disk to engage the trip lever; a pin on the total lever adapted to be engaged by the trip lever; and a clearing key operatively connected to the trip lever and adapted to move said lever to bring it into the field of the pin on the cam disk, whereby upon the return stroke of the handle the trip lever will be operated to force the total lever in one direction for disconnecting the register wheels from the adding sectors.

41. In a key-set adding machine the combination of a shaft; adding sectors mounted thereon, a handle secured to said shaft for rotating the same; a register wheel unit pivotally mounted below said adding sectors, the register wheels of which are adapted for movement into and out of engagement with said adding sectors; a rock arm connected with said register wheel unit for moving the latter; a spring for normally holding the register wheel unit with the register wheels in engagement with the adding sectors; an actuating member in the form of a cam disk secured to and rotatable with said shaft; means carried by the said rock arm to be engaged by the cam disk to move the register wheels out of engagement with the adding sectors; a total clearing lever pivotally mounted adjacent said cam disk for movement in two directions, said lever being movable in one direction for taking the total and retaining the amount in the machine and in the other direction for taking the total and clearing the machine; means carried by said total clearing lever for moving the register wheel unit to disengage the register wheels from the adding sectors on a return stroke of the handle; a resiliently mounted clearing key for predetermining the clearing movement of said total lever; means to hold the said key in depressed position; and means whereby the total lever will release the clearing key.

42. In a key-set adding machine the combination of a shaft; adding sectors mounted thereon; a handle secured to said shaft for rotating the same; a register wheel unit pivotally mounted below said adding sectors; the register wheels of which are adapted for movement into and out of engagement with said adding sectors; a rock arm connected with said register wheel unit for moving the latter; a spring for normally holding the register wheel unit with the register wheels in engagement with the adding sectors; an actuating member in the form of a cam disk secured to and rotatable with said shaft; means carried by the said rock arm to be engaged by the cam disk to move the register wheels out of engagement with the adding sectors; a total clearing lever pivotally mounted adjacent said cam disk and provided with means for moving the register wheel unit to disengage the register wheels from the adding sectors on the return stroke of the handle; a trip lever pivotally mounted adjacent the cam disk and formed with three arms; a pin on the cam disk adapted to engage one arm of the trip lever; a pin on the total lever adapted to be engaged by one of the arms of the trip lever; a clearing key; and a spring flexibly connecting said clearing key to one arm of the trip lever and adapted to move said lever to bring one of its arms into the field of the pin on the cam disk, whereby upon the return stroke of the handle the trip lever will be operated to force the total lever in the direction for disconnecting the register wheels from the adding sectors.

In witness whereof I have hereunto set my hand.

GLENN J. BARRETT.